(12) United States Patent
Sakakibara et al.

(10) Patent No.: US 6,275,009 B1
(45) Date of Patent: Aug. 14, 2001

(54) BATTERY CHARGING DEVICE

(75) Inventors: Kazuyuki Sakakibara; Ariya Noda, both of Anjo (JP)

(73) Assignee: Makita Corporation (JP)

( * ) Notice: Subject to any disclaimer, the term of this patent is extended or adjusted under 35 U.S.C. 154(b) by 0 days.

(21) Appl. No.: 09/710,429

(22) Filed: Nov. 9, 2000

(30) Foreign Application Priority Data

Nov. 10, 1999 (JP) .................................. 11-319679
Sep. 28, 2000 (JP) .................................. 12-296212

(51) Int. Cl.$^7$ .................................................. H01M 10/46
(52) U.S. Cl. ........................................ 320/134; 320/150
(58) Field of Search .................................. 320/124, 125, 320/128, 132, 134, 136, 137, 149, 150

(56) References Cited

U.S. PATENT DOCUMENTS

| 5,497,068 | 3/1996 | Shiojima ................................. 320/35 |
| 5,633,573 | * 5/1997 | Van Phuoc et al. . |
| 5,652,500 | 7/1997 | Kadouchi et al. ..................... 320/15 |
| 5,698,965 | * 12/1997 | York . |
| 5,739,673 | 4/1998 | Le Vann Suu ......................... 320/31 |
| 5,886,527 | 3/1999 | Ito ........................................ 324/431 |
| 5,912,547 | 6/1999 | Grabon ................................. 320/150 |

FOREIGN PATENT DOCUMENTS

| 0621990 | 6/1996 | (EP) . |
| 04351488 | 12/1992 | (JP) . |
| 05244729 | 8/1993 | (JP) . |
| 06121468 | 4/1994 | (JP) . |
| 08164597 | 1/1998 | (JP) . |

* cited by examiner

*Primary Examiner*—Edward H. Tso
(74) *Attorney, Agent, or Firm*—Welsh & Katz, Ltd.; Thomas W. Tolpin (57) ABSTRACT

Hysteresis is stored when charge has been started in a condition in which the battery temperature is high and the capacity is large; upon judging whether such charge has been frequently performed, if it has been judged that the frequency is high, a pattern 4 is selected in which charge is performed by decreasing the current value; with this arrangement, batteries may be used for a long period by decreasing the charge current even if the user should repeatedly perform charge in conditions in which the temperature is high and the residue capacity large through which the life of batteries is shortened.

18 Claims, 11 Drawing Sheets

|  | EXCESS CHARGE/LEFT IDLE FOR A LONG PERIOD | CAPACITY 0% | CAPACITY 100% |
|---|---|---|---|
| LOW TEMPERATURE | 2 | 1 | 2 |
| ROOM TEMPERATURE | 1 | 0 | 1 |
| HIGH TEMPERATURE | 2 | 1 | 2 |

|  | High temperature | Low temperature | Excess charge | Excess discharge |
|---|---|---|---|---|
| Current time | 1 | 0 | 0 | 0 |
| First Previous time | 1 | 0 | 0 | 0 |
| Second Previous time | 0 | 1 | 0 | 1 |
| Third Previous time | 1 | 0 | 0 | 0 |
| Fourth Previous time | 0 | 0 | 0 | 1 |
|  |  |  |  |  |
| Average | 0.6 | 0.2 | 0 | 0.4 |

BATTERY CHARGING DEVICE

BACKGROUND OF THE INVENTION

The present invention relates to a battery charging device for adjusting charge current based on hysteresis of charge.

Battery packages are being presently used that accumulate rechargeable batteries therein that may be repeatedly used as power sources for use in power tools or the like. The battery charging device performs charge at, for instance, a constant current when the battery package is attached and terminates charge when full charge is detected on a basis of, for instance, a changing pattern of battery voltage.

However, since standardized charge is performed in the above battery charging device in accordance with a set program, it would be the case that the life of batteries was remarkably shortened when operations were performed that did not meet an original handling method. For instance, in case an user would insert batteries that have hardly been used into the charger and batteries which capacities have been consumed only by a slight amount were repeatedly charged, the internal pressure of batteries would be further increased by repeatedly generating gas in batteries which are increased in pressure owing to gas generated in the interior thereof immediately before full charge is achieved, and electrodes would be damaged to thereby shorten the life of the batteries.

In order to cope with such subjects, the inventors have devised a method in which the charge current is adjusted based on past charging actions by making the battery charging device perform hysteresis learning. More particularly, when handling methods were repeated in the past through which the life of batteries are shortened, such situations were coped with by decreasing the charge current. However, various requests are being made by users, and it is also expected that one prefers shortening the charging time rather than prolonging the life of batteries.

The present invention has been made for solving the above subjects, and it is a purpose thereof to provide a battery charging device with which it is enabled to use batteries for a long period irrespective of handling methods of users.

The present invention further aims to provide a battery charging device with which batteries may be charged in accordance with handling methods of users.

BRIEF SUMMARY OF THE INVENTION

A battery charging device including a memory device for storing hysteresis of charge, according to the present invention, is characterized by comprising
- a memory means for storing hysteresis of charge in the memory device,
- a judging means for judging whether past charging operations as stored in the memory device shorten the life of batteries, and
- a battery charging means for performing charge by decreasing a current value in case it is judged by the judging means that the life of batteries is shortened.

In the invention, it is judged whether charging actions in the past as stored in a memory device shorten the life of batteries or not, and in case it is judged that life of batteries are shortened thereby, charge is performed by decreasing the current value. With this arrangement, even if the user repeatedly performs charge through which the life of batteries is shortened, batteries may be used for a long period by decreasing the charge current.

A battery charging device including a memory device for storing hysteresis of charge, according to the present invention, is characterized by comprising
- a memory means for storing hysteresis of charge in the memory device,
- a judging means for judging whether past charging operations as stored in the memory device shorten the life of batteries, and
- an indicating device for indicating that the hysteresis of charge is poor in case it is judged by the judging means that the life of batteries is shortened.

In the invention, it is judged whether charging actions in the past as stored in a memory device shorten the life of batteries or not, and in case it is judged that life of batteries are shortened thereby, this fact is being indicated. With this arrangement, it is possible to call for attention in case the user repeatedly performs charge through which the life of batteries is shortened.

A battery charging device including a memory device for storing hysteresis of charge for charging a battery package incorporating therein a plurality of batteries, according to the present invention, is characterized by comprising
- a memory means for storing hysteresis of charge in the memory device,
- a judging means for judging whether past charging operations as stored in the memory device cause fluctuations in residue capacities of the plurality of batteries, and
- a battery charging means for performing supplementary charge upon completion of charge in case it is judged by the judging means that fluctuations in residue capacities are caused.

In the invention, it is determined whether charging/discharging actions in the past as stored in a memory device cause fluctuations in residue capacities of batteries, and in case it is judged that fluctuations are caused thereby, supplementary charge is performed. With this arrangement, the residue capacities of batteries may be adjusted to be uniform even if the user repeatedly performs charge through which residue capacities of respective batteries of the battery package are fluctuated.

A battery charging device including a memory device for storing hysteresis of charge, according to the present invention, is characterized by comprising
- a memory means for storing into the memory device degrees of residue capacities at the time of starting charge,
- a judging means for judging whether past charging operations as stored in the memory device have been frequently started in conditions in which the capacity was large, and
- a battery charging means for performing charge by decreasing the current value in case it has been judged by the judging means that the such charge was frequently performed.

In the invention, it is judged whether charging actions in the past as stored in a memory device have been frequently started with a large amount of capacity, and in case it is judged that such actions have been frequently performed, charge is performed by decreasing the charge current. With this arrangement, even if the user repeatedly performs charge in which residue capacities are large through which the life of batteries is shortened, batteries may be used for a long period by decreasing the charge current.

A battery charging device including a memory device for storing hysteresis of charge, according to the present invention, is characterized by comprising a memory means for storing into the memory device degrees of residue capacities at the time of starting charge, a judging means for judging whether past charging operations as stored in the memory device have been frequently started in conditions in which the capacity was extremely small, and a battery charging means for performing charge by decreasing the current value in case it has been judged by the judging means that the such charge was frequently performed.

In the invention, it is judged whether charging actions in the past as stored in a memory device have been frequently started with quite a small amount of capacity, and in case it is judged that such actions have been frequently performed, charge is performed by decreasing the charge current. With this arrangement, even if the user repeatedly performs charge in which residue capacities are hardly left through which the life of batteries is shortened, batteries may be used for a long period by decreasing the charge current.

A battery charging device including a memory device for storing hysteresis of charge, according to the present invention, is characterized by comprising a memory means for storing into the memory device heights of battery temperatures and degrees of residue capacities at the time of starting charge, a judging means for judging whether past charging operations as stored in the memory device have been frequently started in conditions in which the battery temperature was high and the capacity was large, and a battery charging means for performing charge by decreasing the current value in case it has been judged by the judging means that the such charge was frequently performed.

In the invention, it is judged whether charging actions in the past as stored in a memory device have been frequently started at a high battery temperature and with a large amount of capacity, and in case it is judged that such actions have been frequently performed, charge is performed by decreasing the charge current. With this arrangement, even if the user repeatedly performs charge in which the battery temperature is high and the residue capacities are large through which the life of batteries is shortened, batteries may be used for a long period by decreasing the charge current.

A battery charging device including a memory device for storing hysteresis of charge, according to the present invention, is characterized by comprising a memory means for storing into the memory device heights of battery temperatures at the time of starting charge, a judging means for judging whether past charging operations as stored in the memory device have been frequently started in conditions in which the battery temperature was extremely low, and a battery charging means for performing charge by decreasing the current value in case it has been judged by the judging means that the such charge was frequently performed.

In the invention, it is judged whether charging actions in the past as stored in a memory device have been frequently started at quite a low battery temperature, and in case it is judged that such actions have been frequently performed, charge is performed by decreasing the charge current. With this arrangement, even if the user repeatedly performs charge in which the battery temperature is extremely low through which the life of batteries is shortened, batteries may be used for a long period by decreasing the charge current.

A battery charging device including a memory device for storing hysteresis of charge, according to the present invention, is characterized by comprising a memory means for storing into the memory device heights of battery temperatures and degrees of residue capacities at the time of starting charge, a first judging means for judging whether past charging operations as stored in the memory device have been frequently started in conditions in which the battery temperature was high and the capacity was large, a second judging means for judging whether past charging operations as stored in the memory device have been frequently started in conditions in which the battery temperature was high and the capacity was small, and a battery charging means for performing charge by decreasing the current value in case it has been judged by the first judging means that the charge was frequently performed in a condition which the battery temperature was high and the capacity was large, and a battery charging means for performing charge without decreasing the current value in case it has been judged by the second judging means that the charge was frequently performed in a condition in which the battery temperature was high and the capacity was small.

In the invention, it is judged whether charging actions in the past as stored in a memory device have been frequently started at a high battery temperature and with a large amount of capacity, and in case it is judged that such actions have been frequently performed, charge is performed by decreasing the charge current. With this arrangement, even if the user repeatedly performs charge in which the battery temperature is high and the residue capacities are large through which the life of batteries is shortened, batteries may be used for a long period by decreasing the charge current. On the other hand, it is judged whether charging actions in the past as stored in a memory device have been frequently started at a high battery temperature and with a small amount of capacity, and in case it is judged that such actions have been frequently performed, charge is performed without decreasing the charge current. With this arrangement, when the user uses run down batteries by immediately charging these, charge is performed without decreasing the current value such that charge is completed in a short time so as to meet a desired form for handling for the user.

In accordance with the more preferred teaching of the present invention, the memory device is provided on the battery side.

In the invention, the provision of the memory device on the battery side enables it to adjust charging actions in accordance with actual handling hysteresis of the batteries.

A battery charging device including a memory device for storing hysteresis of charge for charging a battery package, comprising a memory means for storing hysteresis of charge in the memory device, a judging means for judging whether past charging operations as stored in the memory device shorten the life of batteries, and a sound outputting device for outputting through sound that the hysteresis of charge is poor in case it is judged by the judging means that the life of batteries is shortened.

In the invention, it is judged whether past charging operations as stored in the memory device shorten the life of batteries, and if it is determined that the life is shortened, it is output through sound that appropriate charge shall be performed. Thus, in case the user repeatedly performs charging operations through which the life of batteries is shortened, it is possible to call for attention and to make the user perform appropriate charging operations.

A battery charging device including a memory device for storing hysteresis of charge for charging a battery package, comprising a memory means for storing hysteresis of charge in the memory device, a life estimating means for estimating a number of possible charging operations based on the hysteresis as stored in the memory device, and a sound outputting device for outputting through sound the number of possible charging operations as estimated by the life estimating means.

In the invention, a number of possible charging operations is estimated based on the hysteresis as stored in the memory device and the result is output through sound. Thus, it is possible to inform the user of the number of possible charging operations.

DETAILED DESCRIPTION OF THE INVENTION

The battery charging device according to the preferred embodiments of the present invention will now be explained with reference to the drawings.

Figure 1:
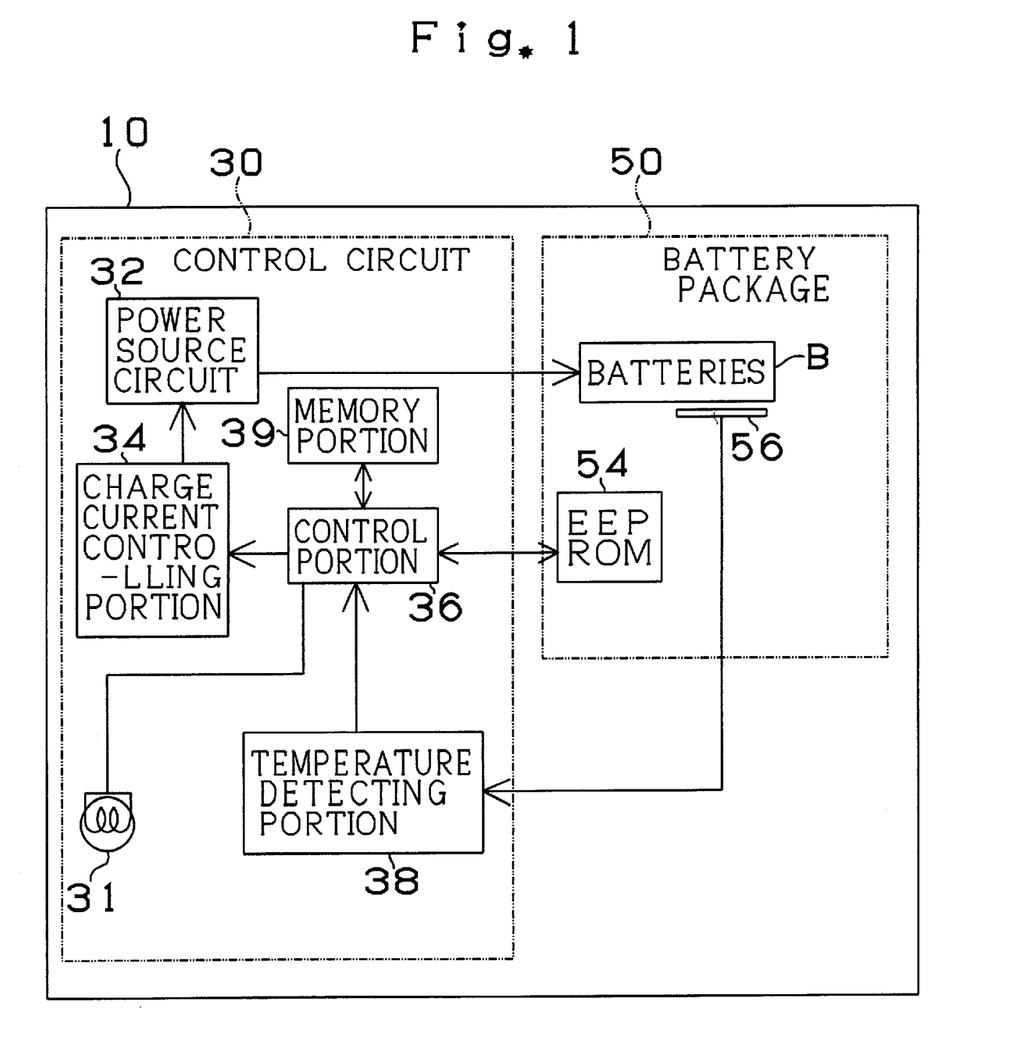
FIG. 1 is a block diagram of the battery charging device and a battery package according to a first embodiment of the present invention.

FIG. 1 illustrates a battery charging device 10 and a battery package 50 according to a first embodiment of the present invention. The battery package 50 accumulates therein nickel-metal hydride batteries B, an EEPROM 54 for maintaining therein hysteresis of charge, and a temperature sensor (thermistor) 56.

On the other hand, a control circuit 30 of the battery charging device 10 is comprised of the following: a temperature detecting portion 38 for detecting a battery temperature based on an output value of the temperature sensor 56; a memory portion 39 for storing information for control; a control portion 36 for reading out hysteresis of charge as stored in the EEPROM 54 of the battery package 50, selecting an optimal charging pattern and outputting the same as a current command value to a charge current controlling portion 34; a charge current controlling portion 34 for controlling a power source circuit 32 based on the current command value from the control portion 36 and for adjusting a charge current for the batteries; a power source circuit 32 for performing charge by impressing voltage on the battery package 50; and an indicator lamp 31 for indicating that no appropriate charge is being performed.

The battery charging device 10 of the illustrated embodiment performs optimal charge in accordance with a form for handling the battery package 50 based on hysteresis of charge maintained in the EEPROM 54 on the battery package 50 side. More particularly, charge is performed in accordance with a charging pattern in which charge is completed in a shortest time when the battery package 50 is being used in ideal forms of handling, that is, in which charge is most frequently performed with the battery capacity being suitably used up and charge being started in a condition in which the batteries have been cooled to room temperature instead of being in high temperature conditions.

On the other hand, in case of forms of handing through which the life of battery package are shortened, that is, in which charge is repeatedly performed although the batteries have been used only to a slight extent, in which charge is started in a high or low temperature condition, or in which charge is performed with the voltage being remarkably decreased owing to excess charge or having been left idle for a long period. Here, a high temperature condition indicates a case in which charge is started after the batteries have been used in a power tool and are generating heat owing to discharge or in which charge is performed at a spot that is exposed to sunrays during summertime. On the other hand, a low temperature condition is a case in which charge is performed outdoors during wintertime or similar.

Figure 2:
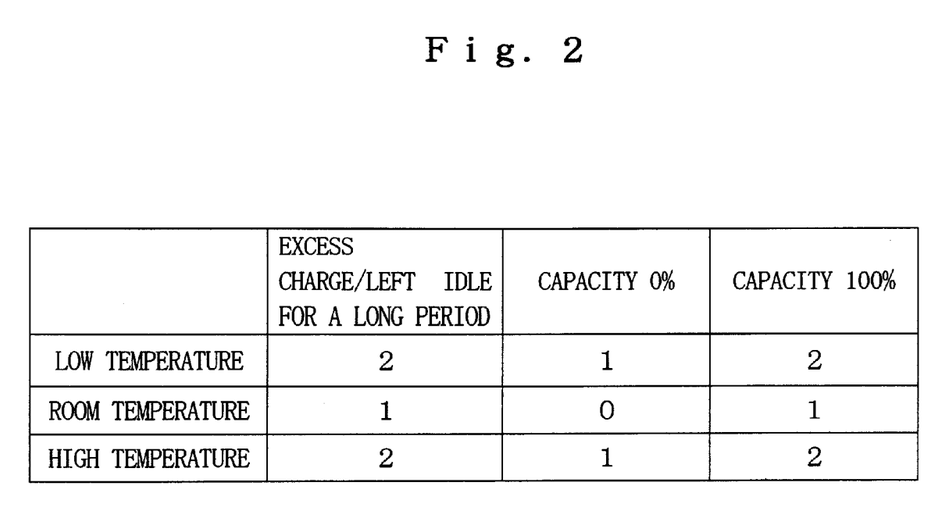
FIG. 2 is a chart for showing levels for calculating total hysteresis levels.

In the battery charging device of the illustrated embodiment, a level as illustrated in FIG. 2 is set for adjusting the charge current in correspondence to an average of the past ten levels (total hysteresis level). From among the levels of FIG. 2, level "0" is set when charge is started in a most favorable condition in which "room temperature—capacity 0%" is satisfied. Level "1" is set in not desired conditions in which charge is started with any one of "low temperature—capacity 0", "high temperature—capacity 0%", "room temperature—excess charge/left idle for long period" or "room temperature—capacity 100%" being satisfied. Further, level "2" is set for conditions in which life of batteries is remarkably shortened, that is, in which charge is started with any one of "low temperature—excess charge/left idle for long period", "low temperature—capacity 100%", "high temperature—excess charge/left idle for long period", or "high temperature—capacity 100%" being satisfied.

The battery charging device 10 further performs adjustment of charge current not only on a basis of the above-described forms of handing of the user but also on hysteresis of the batteries. More particularly, in case the temperature of the batteries has been raised owing to abnormal conditions of a cooling fan provided in the battery charging device, level "1" is increment. An additional level "1" is increment when charge has been repeated for 1,000 times. While the number of charges is increment here, it is alternatively possible to measure an internal resistance as indices for indicating degrees of degradation of the batteries and incrementing a corresponding level when the internal resistance has increased.

The battery charging device 10 further performs supplementary charge in case fluctuations in residue capacities of batteries within the battery package are present. Since fluctuations in residue capacities occur when the above-described total hysteresis level comes to a high condition, supplementary charge is performed in a manner as it will be described later in accordance with the total hysteresis levels.

Figure 3:
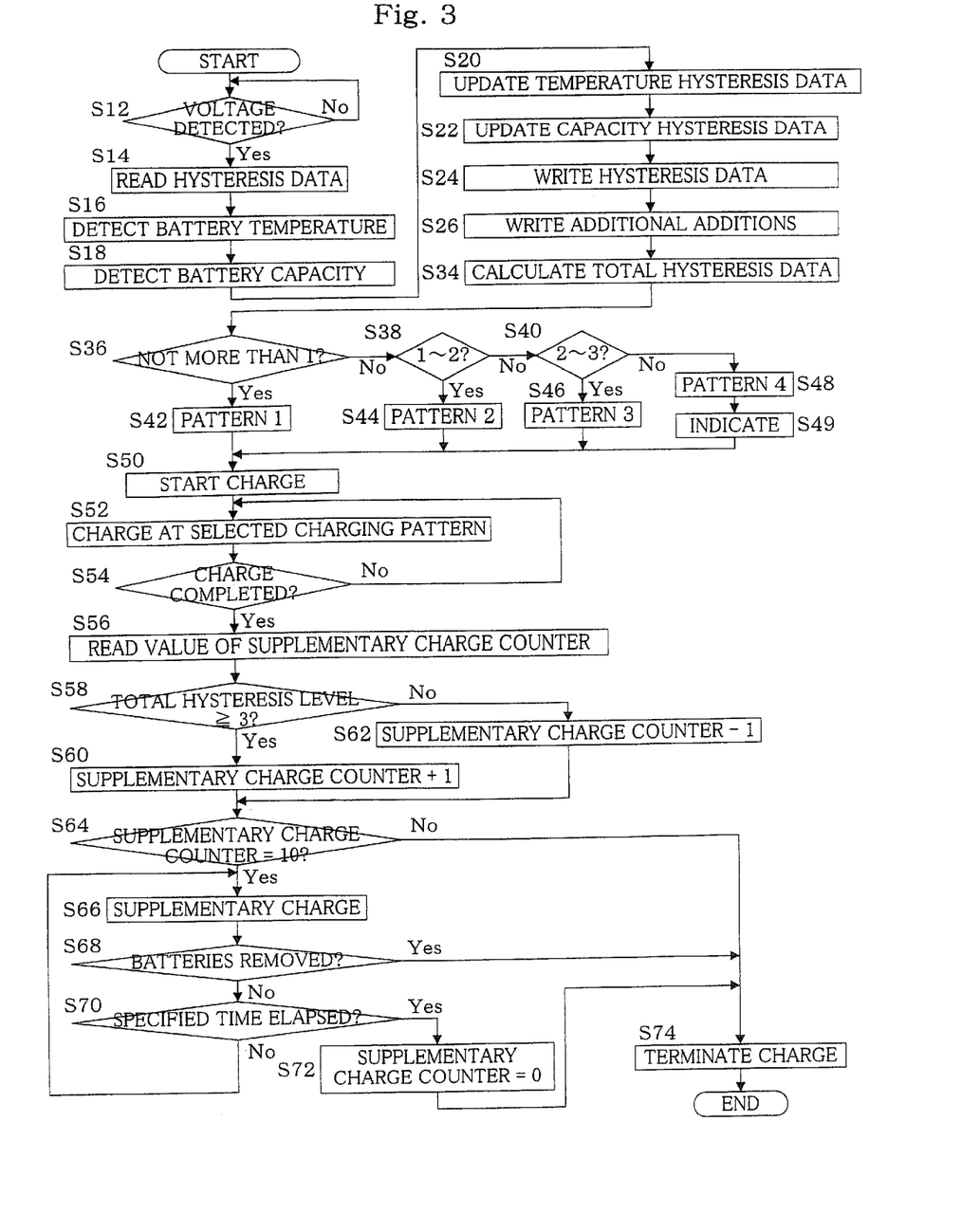
FIG. 3 is a flowchart showing processes performed in a control circuit of the first embodiment.

Charging operations performed by the battery charging device 10 will now be explained in more details with reference to the flowchart of FIG. 3.

When the control portion 39 of the control circuit 30 detects through a voltage detecting portion (not shown) that the battery package 50 has been charged (S12: YES), hysteresis data of charge as stored in the EEPROM 54 are read (S14). The hysteresis data of charge include temperature distinctions at the time charge has been started in the past ten charging operations [low temperature (not more than 10° C.), room temperature (10° C. to 30° C.), and high temperature (exceeding 30° C.)], capacity distinctions [excess charge/left idle for long period (capacity not more than 0%), capacity 0% (capacity exceeding 0% and not more than 70%) and capacity 100% (capacity not less than 70%)] and number of charging operations.

The control portion 39 further detects the temperature of the battery package 50 through the temperature detecting portion 38 based on the output value of the temperature sensor 56 (S16), and detects the capacity of the battery package based on an open-circuit voltage before charge is started (S18). Thereafter, data related to temperature distinction and capacity distinction as detected this time are updated (S20, S22) and written to the EEPROM 54 side (S24). Additional data are further written (S26), wherein level "1" is increment as this additional data in case of an abnormal condition of the cooling fan of the battery charging device as described above. An additional level "1" is increment when charge has been repeatedly by 1,000 times.

Total hysteresis data are calculated. When the user repeatedly performs charge although the batteries are in fully charged conditions, and the past ten operations indicate that charge has been performed twice in the "room temperature—capacity 0%" condition and eight times in the "room temperature—capacity 100%" condition, and charge is to be started in the "room temperature—capacity 100%" condition this time, the total hysteresis data will be given by the equation below as it is evident from the chart of FIG. 2.

(2×0+8×1)÷10+1=1.8

In case (which is an undesirable case) the user repeatedly performs charge at high temperature although the batteries are in fully charged conditions, and the past ten operations indicate that charge has been performed twice in the "room temperature—capacity 0%" condition and eight times in the "high temperature—capacity 100%" condition, and charge is to be started in the "room temperature—capaity 100% " condition this time, the total hysteresis data will be given by the equation below.

(2×0+8×2)÷10+1=2.6

On the other hand, in case (which is a relatively favorable example for handling) the past ten operations indicate that charge has been performed seven times in the "room temperature—capacity 0%" condition and three times in the "room temperature—capacity 100%" condition, and charge is to be started in the "room temperature—capacity 100%" condition, the total hysteresis data will be given by the equation below.

(7×0+3×1)÷10+1=1.3

When charge of the battery package 50 has been repeated by 1,000 times, an increment value of 1 is added in the above-described step 26 so that the total hysteresis data will be 2.3.

A charging pattern matching the total hysteresis data will be selected in steps 36 to 48. In case the total hysteresis level is not more than 1 (S36: YES), pattern 1 in which a large current is supplied for completing charge in a shortest time is selected (S42). When the total hysteresis is in the range of 1 to 2 (S38: YES), pattern 2 in which a relatively large current is supplied for completing charge in a relatively short time is selected (S44). When the total hysteresis is in the range of 2 to 3 (S38: YES), pattern 3 in which a mediate amount of current is supplied for protecting the batteries is selected (S46). When the total hysteresis is not less than 3 (S40: NO), pattern 4 in which a smallest amount of current is supplied for protecting the batteries is selected (S48), and the indicating lamp 31 is further switched ON (S49) for indicating and calling for attention that charge is repeated through which the life of batteries is shortened.

Charge is started (S50) and performed in accordance with the selected pattern as described above (S52). Upon completion of charge (S54: YES), the value of a supplementary current counter is read from the EEPROM 54 of the battery package (S56). It is then judged whether charge or discharge has been performed in which either the total hysteresis level exceeded 3 or fluctuations in residue capacities of the batteries in the battery package were caused (S58). In case charge had been performed through which fluctuations in residue capacities of the batteries in the battery package were caused (S58: YES), the supplementary current counter is increment by 1 (S60). On the other hand, in case charge has been performed without causing fluctuations in the residue capacities (S58: NO), the supplementary current counter is decrement by 1 (S62). It is then judged whether the value of the supplementary current counter has reached 10 (S64). Charge is performed until the value has reached 10 (S64: NO) and charge is terminated accordingly (S74). On the other hand, in case the value of the supplementary charge counter has reached 10 (S64: YES), supplementary charge is performed at a current that corresponds to approximately ¹⁄₁₀ of the current used at the time of charge (S66). By the elapse of a specified time (e.g. 1 hour)(S70: YES) without removing the battery package (S68: NO), the supplementary charge is completed and the supplementary charge counter reset to 0 (S72) for terminating charge (S74).

Figure 4:
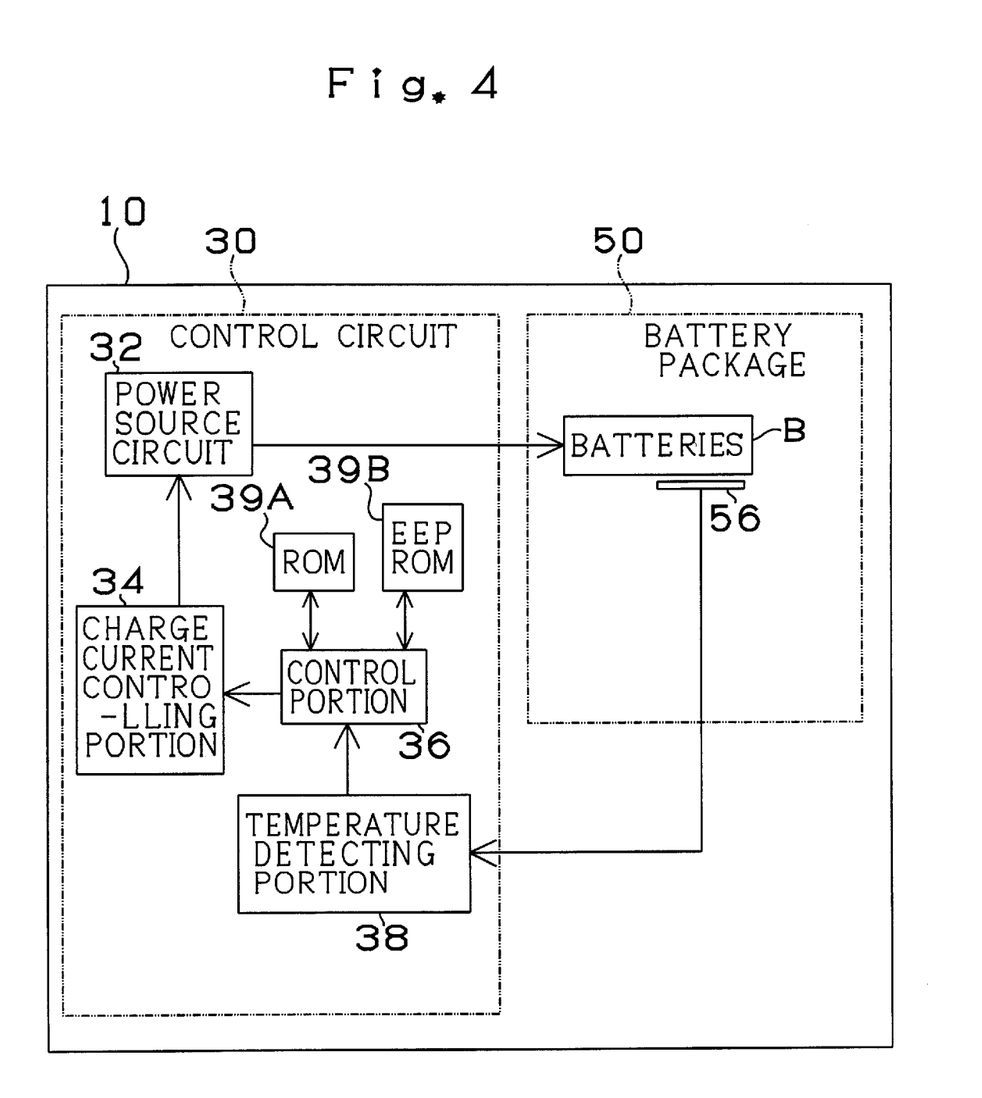
FIG. 4 is a block diagram of the battery charging device and a battery package according to a second embodiment of the present invention.
Figure 5:
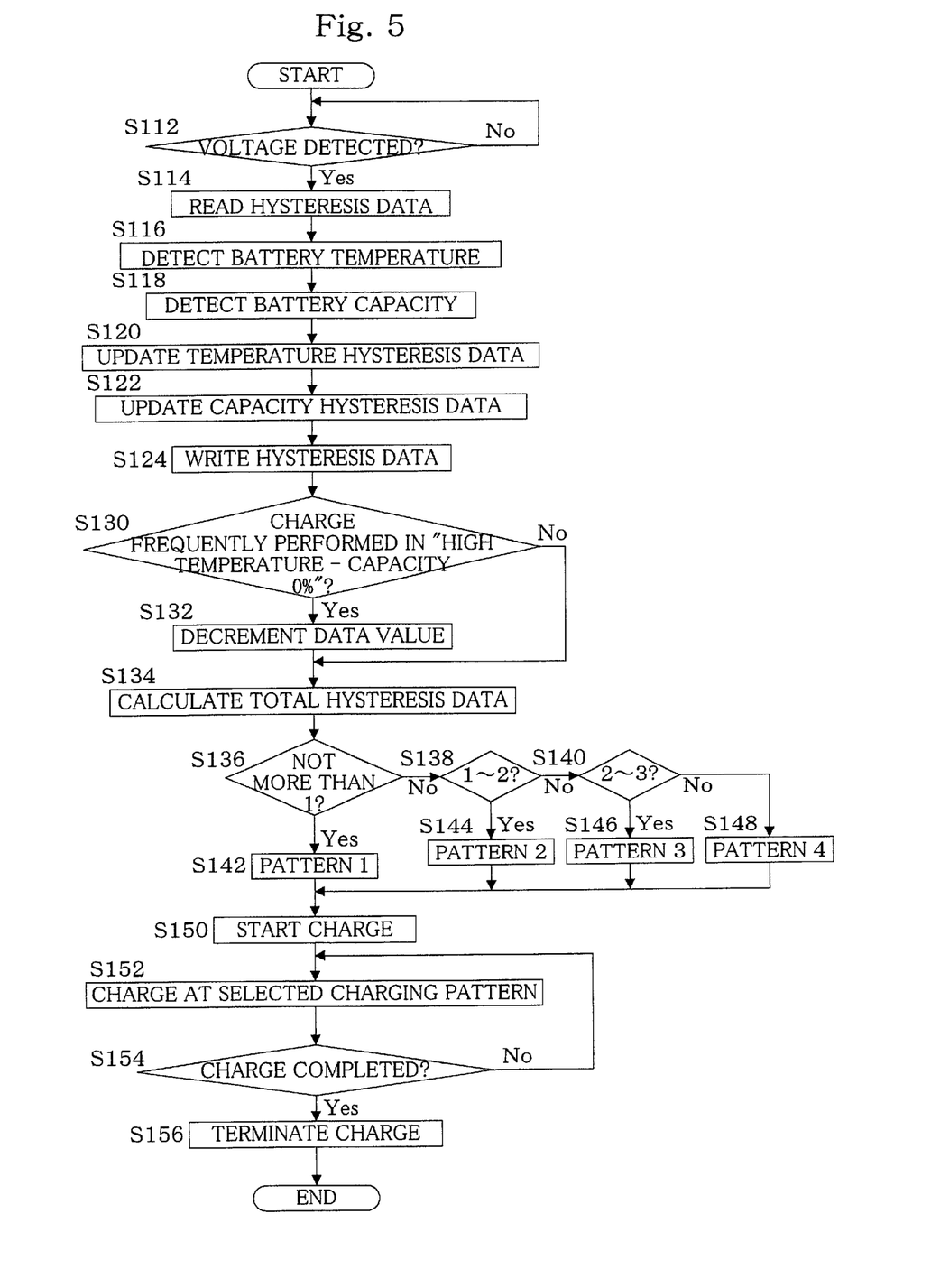
FIG. 5 is a flowchart showing processes performed in a control circuit of the second embodiment.

The battery charging device according to a second embodiment of the present invention will now be explained with reference to FIGS. 4 and 5. FIG. 4 illustrates an arrangement of the battery charging device of the second embodiment and FIG. 5 charging processes performed by the battery charging device.

The EEPROM 54 had been incorporated on the battery package 50 side in the above-described first embodiment. In the second embodiment, an EEPROM 39B is provided on the battery charging device 10 side as illustrated in FIG. 4. It was further the case in the first embodiment that only the life of the batteries had been taken into considerations when performing the above-described hysteresis control. In contrast thereto, the second embodiment not only takes the life of batteries but also forms of handling of users into consideration. More particularly, it is not at all favorable in view of life of batteries that charge is performed at capacity 0% when the batteries are in high temperature conditions. Control has thus been performed in the first embodiment for decreasing the charge current by increasing the level values. In contrast thereto, it is assumed that that fact that charge is frequently performed in a high temperature and capacity 0% condition since the user puts priority on the performance of his or her work by using the battery package and that the user wishes to decrease the charging time rather than prolonging the life of the batteries so that charge is completed in a short time in the second embodiment.

Charging operations performed by the battery charging device 10 of the second embodiment will be explained in more details with reference to the flowchart of FIG. 5.

When the control portion 39 of the control circuit 30 detects through a voltage detecting portion (not shown) that the battery package 50 has been charged (S112: YES), hysteresis data of charge as stored in the EEPROM 39B is read (S114). The hysteresis data of charge include temperature distinctions and capacity distinctions at the time charge has been started in the past ten charging operations.

The control portion 39 further detects the temperature of the battery package 50 (S116) and detects the capacity of the battery package (S118). Thereafter, data related to temperature distinctions and capacity distinctions detected this time are updated (S120, S122) and written to the EEPROM 39B side (S124).

It is judged whether charge is frequently performed with the condition "high temperature—capacity 0%" being satisfied (S130). In case charge has been performed for more than five times among the past ten times in which "high temperature—capacity 0%" is satisfied, it is judged that such charge is frequently performed (S132). A value for decrementing the level value is set when such charge is frequently performed (S132). More particularly, in case the number of times in which charge has been performed in the "high temperature—capacity 0%" condition is, for instance, eight, a value for decrementing of $(-1\times8)\div10=-0.8$ is set.

Total hysteresis data are calculated by counting in the above value for decrementing (S134). For instance, in case charge has been performed twice in the "room temperature—capacity 0%" condition and eight times in the "high temperature—capacity 0%" condition, and charge is to be started in the "room temperature—capacity 100%" condition this time, the total hysteresis data will be given by the equation below as it is evident from the chart of FIG. 2.

$$(2\times0+8\times1)\div10+0-0.8=0$$

A charging pattern matching the total hysteresis level will be selected in steps 136 to 148. In the illustrated example in which charge is frequently performed by satisfying the condition "high temperature—capacity 0%", the total hysteresis level will be not more than 1 (S136: YES) and pattern 1 in which the charging time is set to be shortest is selected (S138). For comparison, the total hysteresis level of the first embodiment was 1.8 in which pattern 2 was selected. The remaining processes are similar to those of the first embodiment so that explanations thereof will be omitted.

Figure 6:
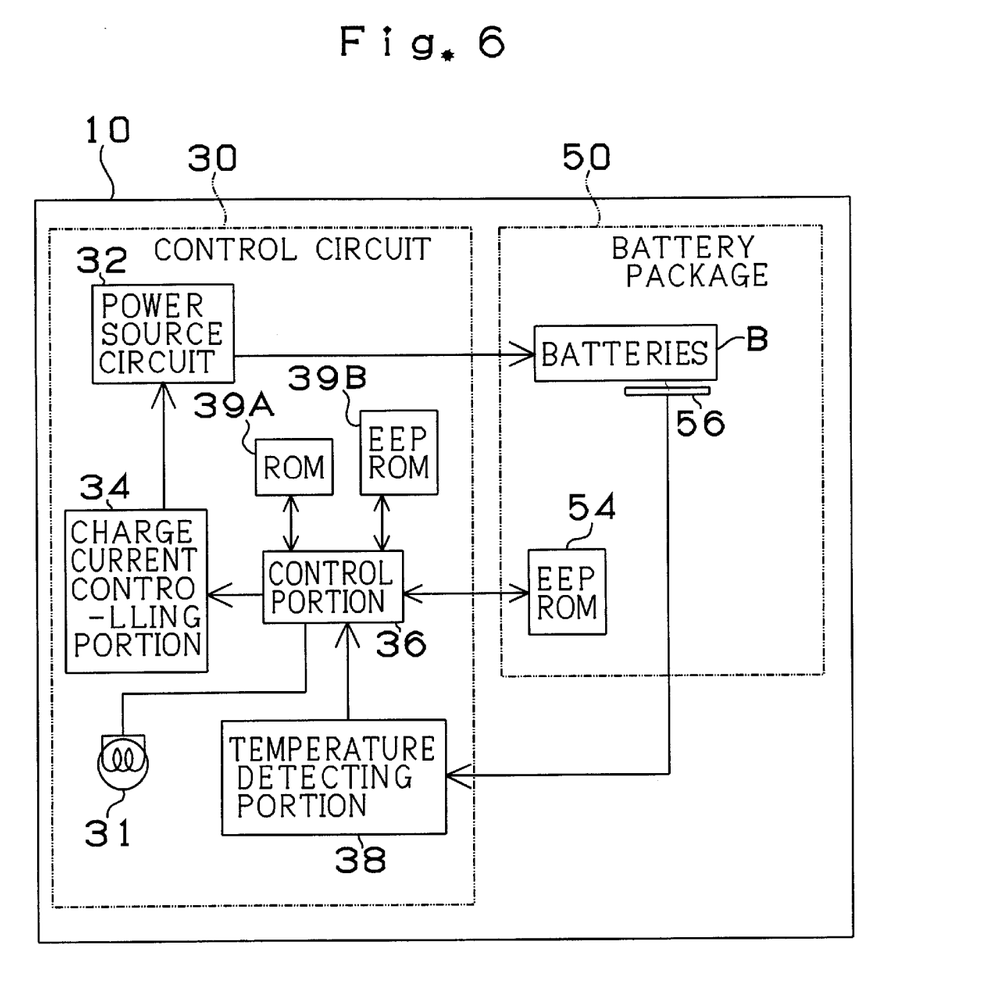
FIG. 6 is a block diagram of the battery charging device and a battery package according to a third embodiment of the present invention.
Figure 7:
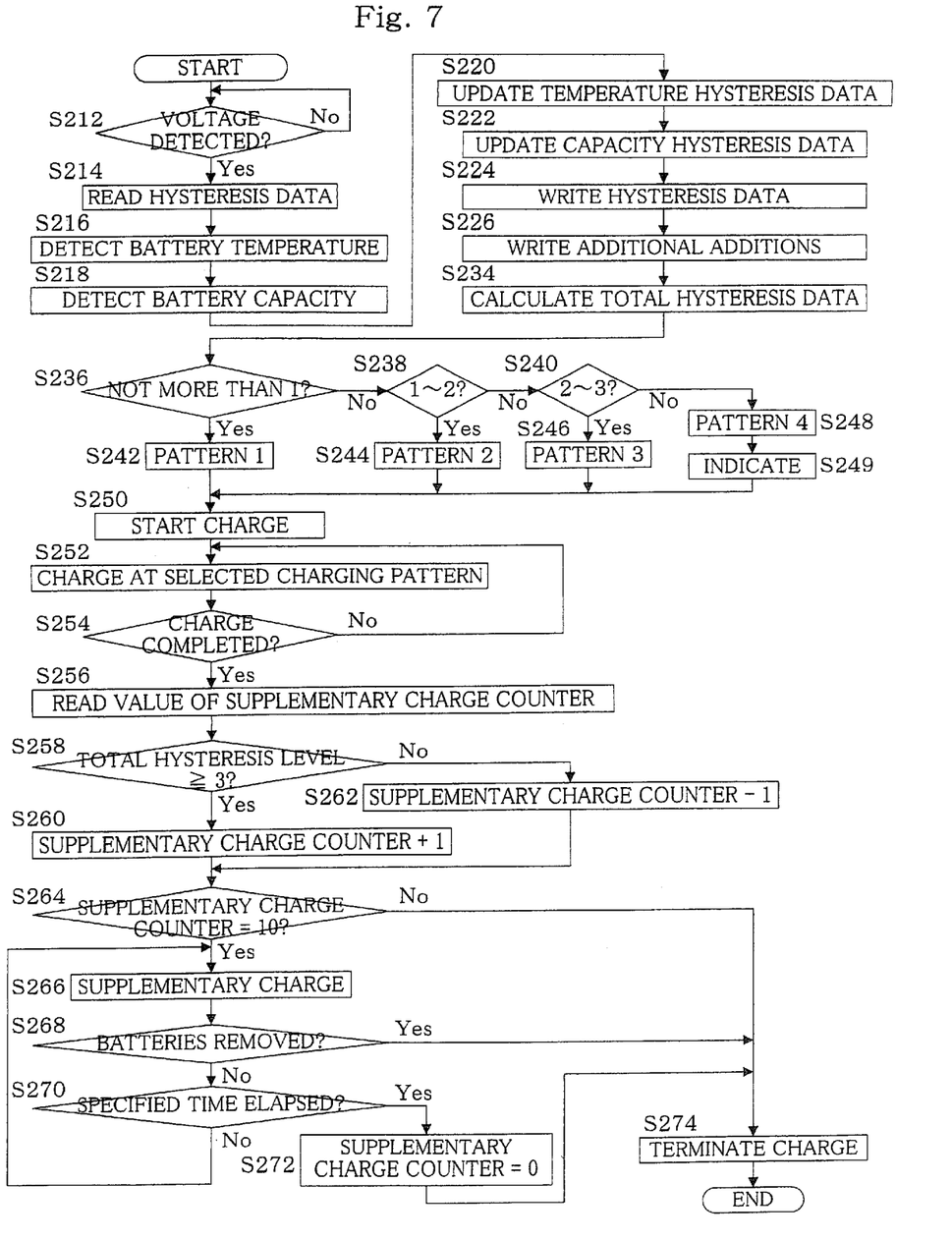
FIG. 7 is a flowchart showing processes performed in a control circuit of the third embodiment.

The battery charging device according to a third embodiment of the present invention will now be explained with reference to FIGS. 6 and 7. FIG. 6 illustrates an arrangement of the battery charging device of the third embodiment and FIG. 7 charging processes performed by the battery charging device.

The EEPROM 54 had been incorporated on the battery package 50 side in the above-described first embodiment while the EEPROM 39B was provided on the battery charging device side in the second embodiment. In the third embodiment, the EEPROM 39B is incorporated on the battery charging device 10 side and the EEPROM 54 on the battery package 50 side as illustrated in FIG. 6. In accordance with this arrangement, hysteresis data that are more appropriately maintained on the battery charging device side are stored in the EEPROM 39B of the battery charging device and data that are more desirably maintained on the battery package side are maintained in the EEPROM 54 on the battery package 50 side.

Charging operations performed by the battery charging device 10 of the third embodiment will be explained in more details with reference to the flowchart of FIG. 7.

When the control portion 39 of the control circuit 30 detects through a voltage detecting portion (not shown) that the battery package 50 has been charged (S212: YES), hysteresis data of charge as stored in the EEPROM 39B are read (S214). The control portion 39 further detects the temperature of the battery package 50 (S216) and detects the capacity of the battery package (S218). Thereafter, data related to temperature distinctions and capacity distinctions detected this time are updated (S220, S222) and written to the EEPROM 39B side (S224). In other words, data related to habits of the user are maintained in the EEPROM 39B on the battery charging device side.

Additional data are then written to the EEPROM 54 on the battery package side, similarly to the first embodiment (S226). Level "1" is increment as this additional data in case of an abnormal condition of the cooling fan of the battery charging device as described above, and an additional level "1" is increment when charge has been repeatedly by 1,000 times. In other words, data inherent to the battery package 50 are maintained in the EEPROM 54 of the battery package.

Total hysteresis data maintained in the EEPROM 54 on the battery package side and total hysteresis data maintained in the EEPROM 39B on the battery charging device side are summed up (S234). A charging pattern matching the total hysteresis data is selected in steps 236 to 248. The remaining processes are similar to those of the first embodiment so that explanations thereof will be omitted.

Since a memory device (EEPROM) is provided on the battery package 50 side in the first embodiment, it is possible to maintain hysteresis that match actual forms of handling of the battery package. The memory device is provided on the battery charging device side in the second embodiment so that the entire system may be arranged at low costs in case a plurality of battery packages are used. Further, respective memory device are provided on both of the battery package and the battery charging device in the third embodiment so that it is possible to arrange an optimal system.

The battery charging device according to the fourth embodiment of the present invention will now be explained with reference to the drawings.

Figure 8:
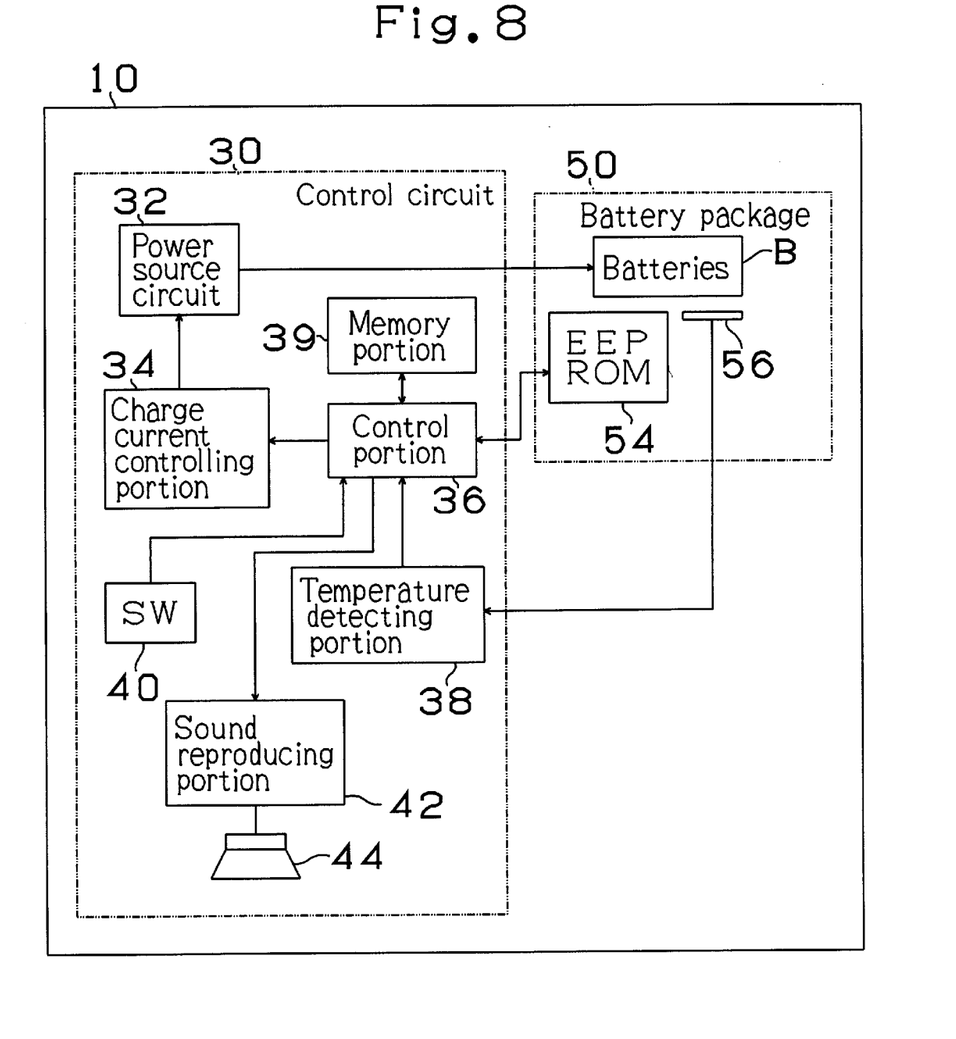
FIG. 8 is a block diagram of the battery charging device and the battery package according to a fourth embodiment of the present invention.

FIG. 8 illustrates a battery charging device 10 and a battery package 50 according to the fourth embodiment of the present invention. The battery package 50 accumulates therein nickel-metal hydride batteries B, an EEPROM 54 for maintaining therein hysteresis of charge, and a temperature sensor (thermistor) 56.

On the other hand, a control circuit 30 of the battery charging device 10 is comprised of the following: a temperature detecting portion 38 for detecting a battery temperature based on an output value of the temperature sensor 56; a memory portion 39 for storing information for control; a control portion 36 for reading out hysteresis of charge as stored in the EEPROM 54 of the battery package 50, judging whether appropriate charging operations are performed, estimating a life of batteries, further determining a charge current based on the battery temperature as detected by the temperature detecting portion 38 and outputting the same as a current command value to a charge current controlling portion 34; a charge current controlling portion 34 for controlling a power source circuit 32 based on the current command value from the control portion 36 and for adjusting a charge current for the batteries; a power source circuit 32 for performing charge by impressing voltage on the battery package 50; a sound outputting switch 40 for outputting through sound whether appropriate charging operations are performed; and a sound reproducing portion 42 for making sound output through a speaker 44.

In the battery charging device 10 of the fourth embodiment, it is determined whether appropriate charging operations are performed based on hysteresis of charge as stored in the EEPROM 54 on the battery package 50 side upon actuation of the sound outputting switch 40, and in case appropriate charging operations are performed, a sound such as "charging operation is friendly to the batteries" is output through the speaker 44. At the same time, the remaining number of possible charging operations is estimated based on the hysteresis of charge, and a sound such as "300 charging operations may still be performed" is output through the speaker 44.

On the other hand, in case of forms of handling through which the life of battery package is shortened, that is, in which charge is repeatedly performed although the batteries have been used only to a slight extent, a sound such as "a tendency of excess charge exists" is output. On the other hand, in case charge is frequently performed in which the voltage is remarkably decreased owing to excess charge or having been left idle for a long term, it is output through sound that "a tendency of excess discharge exists". Further, in case charge is frequently started in a high temperature condition, for instance, in which charge is started after the batteries have been used in a power tool and are generating heat owing to discharge or in which charge is performed at a spot that is exposed to sunrays, it is output through sound that "a tendency of high temperature exists". On the other hand, in case charge is frequently started in a low temperature condition, for instance, in which charge is performed outdoors during wintertime, it is output through sound that "a tendency of low temperature exists". With this arrangement, it is possible to call for attention and to make the user perform appropriate charging operations to thereby prolong the life of batteries.

Figure 9:
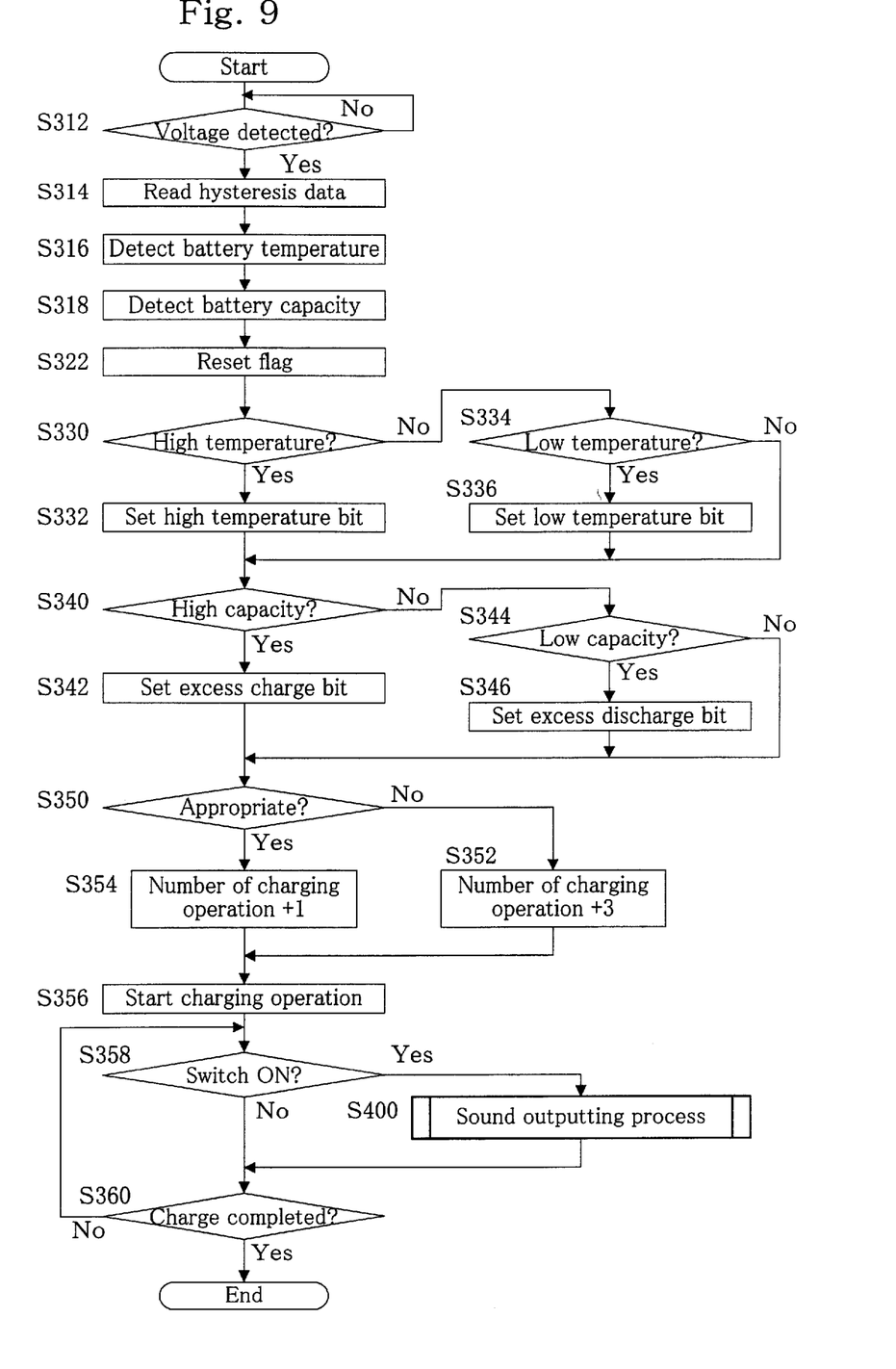
FIG. 9 is a flowchart showing main processes performed in the control circuit of the first embodiment.

Charging operations performed by the battery charging device 10 will now be explained in more details with reference to the flowchart of FIG. 9.

When the control portion 39 of the control circuit 30 detects through a voltage detecting portion (not shown) that the battery package 50 has been charged (S312: YES), hysteresis data of charge as stored in the EEPROM 54 are read (S314). The hysteresis data of charge include the number of charging operations, and a hysteresis flag of four bits representing temperature distinctions and capacity distinctions at times charge have been started in the past four charging operations. From among the hysteresis flag as illustrated in FIG. 11, a first bit is a high temperature bit indicating that the temperature was high (exceeding 30° C.) at the time of starting charge, a second bit is a low temperature bit indicating that the temperature was low (not more than 10° C.) at the time of starting charge, a third bit is a bit of an excess charge condition indicating that the capacity was high (capacity not less than 70%) at the time of starting charge, and a fourth bit is a bit of an excess charge/long-term-left-idle condition indicating that the capacity was low (capacity not more than 0%) at the time of starting charge.

Figure 11:
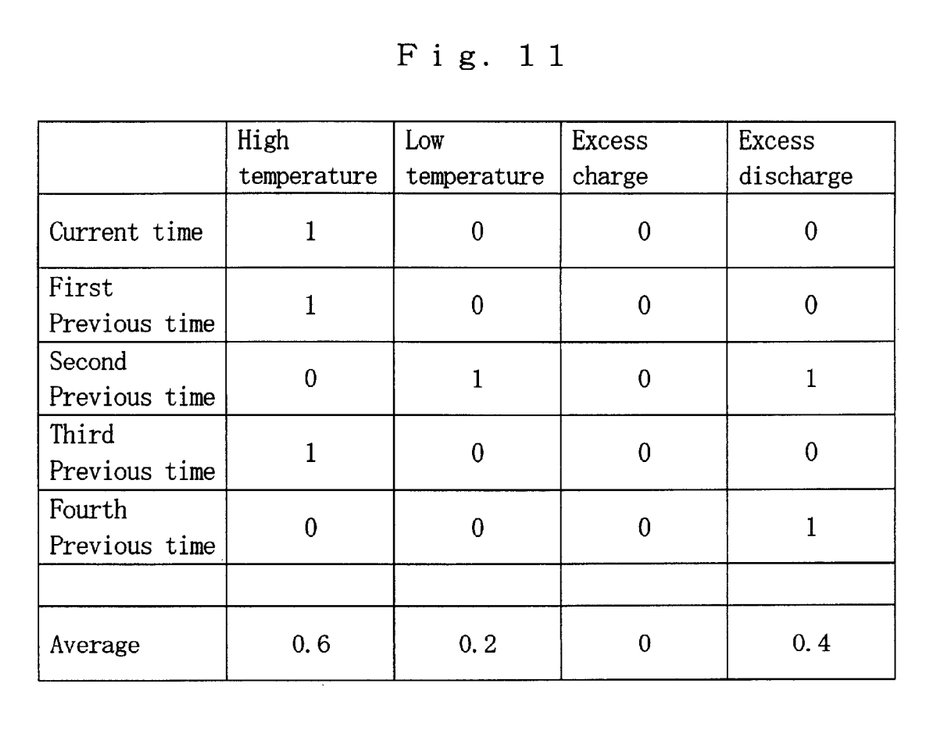
FIG. 11 is an explanatory view of hysteresis of charge of the battery charging device according to the fourth embodiment.

In FIG. 11, hysteresis flag "1000" for a charging operation that has been performed the last time indicates that charge has been started in a high temperature condition, and hysteresis flag "0101" for a charging operation that has been performed the last but one time indicates that charge has been started in a low temperature and an excess charge condition.

The control portion 39 further detects the temperature of the battery package 50 through the temperature detecting portion 38 based on the output value of the temperature sensor 56 (S316), and detects the capacity of the battery package based on an open-circuit voltage before charge is started (S318). Thereafter, the hysteresis flag for the fifth operation in advance of the current one is reset (S322) and the current hysteresis is left (S330 to S346). In other words, since the battery charging device of the fourth embodiment maintains hysteresis of charge of the past four times, the hysteresis data of charge of the fifth operation performed in advance of the current one is replaced by the current data.

It is determined whether the temperature is high (exceeding 30° C.)(S330). If the temperature is high (S330: YES), the first bit of the hysteresis flag (high temperature bit) is set to "1" (S332). If the temperature is not high (S330: NO), it is then determined whether the temperature is low (not more than 10° C.)(S334). In case the temperature is low (S334: YES), the second bit of the hysteresis flag (low temperature bit) is set to "1" (S334). In case the temperature is neither high nor low (S334: NO), the process proceeds to S340 without setting any flags.

It is then determined whether the capacity is high or not (capacity not less than 70%)(S340). If the capacity is high (S340: YES), the third bit of the hysteresis flag (bit of excess charge condition) is set to "1" (S342). If the capacity is not high (S340: NO), it is then determined whether the capacity is low (not more than 0%)(S344). In case the capacity is low (S344: YES), the fourth bit of the hysteresis flag (bit of excess charge condition) is set to "1" (S334). In case the capacity is neither high nor low (S344: NO), the process proceeds to S350 without setting any flags.

It is determined in S350 whether any of the bits have been set to "1", that is, whether the current charging operation is an appropriate charging operation or not. In case the charging operation is appropriate (S350: YES), the number of charging operation is increased by one (S354). On the other hand, in case the charging operation is inappropriate (S350: NO), the number of charging operation is increased by three (S352). In other words, since one inappropriate charging operation corresponds to performing three appropriate charging operations, it is stored that three charging operations have been performed. Thereafter, charge is started (S356) for performing charging operation by adjusting the charge current based on the battery temperature. When the above-described sound outputting switch 40 is actuated during charging operations (S358: YES), a sound outputting process is performed by proceeding to S400 for outputting through sound whether charge is appropriately performed and for outputting through sound the remaining number of possible charging operations (S400). Upon completion of charge (S360: YES), the process is terminated.

Figure 10:
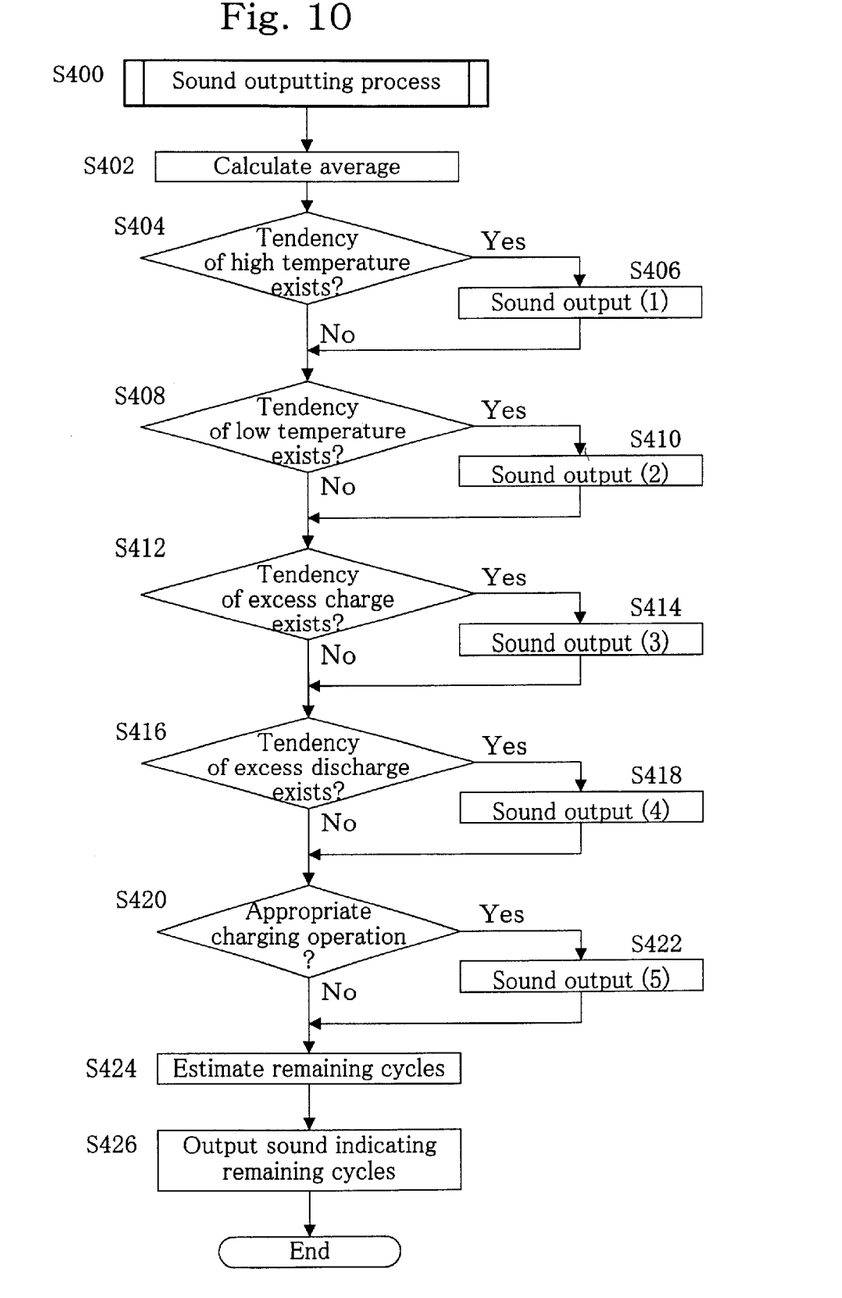
FIG. 10 is a flowchart showing sub-routines of sound outputting processes in FIG. 9.

The sound outputting process at S400 will now be explained with reference to FIG. 10 illustrating a sub-routine of this process.

The control portion 36 obtains an average of hysteresis of charge of the past four and the current charging operations from the above-described hysteresis flag with reference to FIG. 11 (S402). For instance, in case charge has been started three times in a high temperature condition, the average will be 0.6; in case charge has been started once in a low temperature condition, the average will be 0.2; in case no charge has been started in an excess charge condition, the average will be 0; and in case charge has been started twice in an excess charge condition, the average will be 0.4.

It is then determined whether a tendency exists in which charge is started in a high temperature condition based on the average value for starting charge in a high temperature condition (S404). In case the average value is not less than 0.4, it is determined that a tendency of high temperature condition exists (S404: YES), and a sound (1: a tendency of high temperature exists) is output through the speaker 44 via the sound reproducing portion 42 (S406). On the other hand, in case no tendency of high temperature exists (S404: NO), the process proceeds to S408.

It is then determined whether a tendency exists in which charge is started in a low temperature condition based on the average value for starting charge in a low temperature condition (S408). In case the average value is not less than 0.4, it is determined that a tendency of low temperature condition exists (S408: YES), and a sound (2: a tendency of low temperature exists) is output through the speaker 44 (S410). On the other hand, in case no tendency of low temperature exists (S408: NO), the process proceeds to S412.

It is thereafter determined whether a tendency exists in which charge is started in a high capacity condition based on the average value for starting charge in a high capacity condition (S412). In case the average value is not less than 0.4, it is determined that a tendency of excess charge condition exists (S412: YES), and a sound (3: a tendency of excess charge condition exists) is output through the speaker 44 via the sound reproducing portion 42(S414). On the other hand, in case no tendency of high capacity exists (S412: NO), the process proceeds to S416.

It is then determined whether a tendency exists in which charge is started in a low capacity condition based on the average value for starting charge in a low capacity condition (S416). In case the average value is not less than 0.4, it is determined that a tendency of excess discharge condition exists (S416: YES), and a sound (4: a tendency of excess discharge condition exists) is output through the speaker 44 (S418). On the other hand, in case no tendency of excess discharge exists (S416: NO), the process proceeds to S420.

It is finally determined whether appropriate charge is performed, that is, whether all of the average values of the high temperature bit, low temperature bit, excess charge bit and excess discharge bit of the hysteresis flag are less than 0.4 (S420). In case charging operations are appropriately performed, that is, no sound outputs have been made in the above S406, S410, S414 and S418 (S420: YES), a sound (5: charging operation is friendly to the batteries) is output through the speaker 44 (S422).

By decrementing the number of charging operations that have been summed in the above S452 or S454 from a preliminary set standard number of charging operations, the remaining number of possible charging operations is estimated (S424), and the estimated number of possible charging operations is output through sound such as "300 charging operations may still be performed" through the speaker 44.

In the fourth embodiment, a flag of four bits has been employed for storing four items, high temperature, low temperature, low capacity and high capacity, as hysteresis. However, it rarely happens that both of a high temperature condition and a low temperature condition are generated in a single series of hysteresis, and it similarly rarely happens that both of a low capacity condition and a high capacity condition are generated in a single series of hysteresis. It is therefore possible to arrange the flag to be of a two-bit structure in which one bit is set in case charge is started either in a high temperature condition or a low temperature condition and in which one bit is set in case charge is started either in a low capacity condition or a high capacity condition to thereby reduce the capacity of the memory.

It is determined in the fourth embodiment whether the stored past hysteresis of charge shorten the life of batteries or not, and in case it is determined that the life is shortened, it is output through sound that appropriate charging operations shall be performed. Thus, in case the user repeatedly performs charging operations through which the life of batteries is shortened, it is possible to call for attention and to make the user perform appropriate charging operations.

Further, a number of possible charging operations is estimated based on the hysteresis as stored in the memory device and the result is output through sound. Thus, it is possible to inform the user of the number of possible charging operations.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A battery charging device including a memory device for storing hysteresis of charge, comprising
 a memory means for storing hysteresis of charge in the memory device,
 a judging means for judging whether past charging operations as stored in the memory device shorten the life of batteries, and
 a battery charging means for performing charge by decreasing a current value in case it is judged by the judging means that the life of batteries is shortened.

2. A battery charging device including a memory device for storing hysteresis of charge, comprising
 a memory means for storing hysteresis of charge in the memory device,
 a judging means for judging whether past charging operations as stored in the memory device shorten the life of batteries, and
 an indicating device for indicating that the hysteresis of charge is poor in case it is judged by the judging means that the life of batteries is shortened.

3. A battery charging device including a memory device for storing hysteresis of charge for charging a battery package incorporating therein a plurality of batteries, comprising
 a memory means for storing hysteresis of charge in the memory device,
 a judging means for judging whether past charging operations as stored in the memory device cause fluctuations in residue capacities of the plurality of batteries, and
 a battery charging means for performing supplementary charge upon completion of charge in case it is judged by the judging means that fluctuations in residue capacities are caused.

4. A battery charging device including a memory device for storing hysteresis of charge, comprising
- a memory means for storing into the memory device degrees of residue capacities at the time of starting charge,
- a judging means for judging whether past charging operations as stored in the memory device have been frequently started in conditions in which the capacity was large, and
- a battery charging means for performing charge by decreasing the current value in case it has been judged by the judging means that the such charge was frequently performed.

5. A battery charging device including a memory device for storing hysteresis of charge, comprising
- a memory means for storing into the memory device degrees of residue capacities at the time of starting charge,
- a judging means for judging whether past charging operations as stored in the memory device have been frequently started in conditions in which the capacity was extremely small, and
- a battery charging means for performing charge by decreasing the current value in case it has been judged by the judging means that the such charge was frequently performed.

6. A battery charging device including a memory device for storing hysteresis of charge, comprising
- a memory means for storing into the memory device heights of battery temperatures and degrees of residue capacities at the time of starting charge,
- a judging means for judging whether past charging operations as stored in the memory device have been frequently started in conditions in which the battery temperature was high and the capacity was large, and
- a battery charging means for performing charge by decreasing the current value in case it has been judged by the judging means that the such charge was frequently performed.

7. A battery charging device including a memory device for storing hysteresis of charge, comprising
- a memory means for storing into the memory device heights of battery temperatures at the time of starting charge,
- a judging means for judging whether past charging operations as stored in the memory device have been frequently started in conditions in which the battery temperature was extremely low, and
- a battery charging means for performing charge by decreasing the current value in case it has been judged by the judging means that the such charge was frequently performed.

8. A battery charging device including a memory device for storing hysteresis of charge, comprising
- a memory means for storing into the memory device heights of battery temperatures and degrees of residue capacities at the time of starting charge,
- a first judging means for judging whether past charging operations as stored in the memory device have been frequently started in conditions in which the battery temperature was high and the capacity was large,
- a second judging means for judging whether past charging operations as stored in the memory device have been frequently started in conditions in which the battery temperature was high and the capacity was small, and
- a battery charging means for performing charge by decreasing the current value in case it has been judged by the first judging means that the charge was frequently performed in a condition which the battery temperature was high and the capacity was large, and
- a battery charging means for performing charge without decreasing the current value in case it has been judged by the second judging means that the charge was frequently performed in a condition in which the battery temperature was high and the capacity was small.

9. The battery charging device as claimed in claim 1, wherein the memory device is provided on the battery side.

10. The battery charging device as claimed in claim 2, wherein the memory device is provided on the battery side.

11. The battery charging device as claimed in claim 3, wherein the memory device is provided on the battery side.

12. The battery charging device as claimed in claim 4, wherein the memory device is provided on the battery side.

13. The battery charging device as claimed in claim 5, wherein the memory device is provided on the battery side.

14. The battery charging device as claimed in claim 6, wherein the memory device is provided on the battery side.

15. The battery charging device as claimed in claim 7, wherein the memory device is provided on the battery side.

16. The battery charging device as claimed in claim 8, wherein the memory device is provided on the battery side.

17. A battery charging device including a memory device for storing hysteresis of charge for charging a battery package, comprising
- a memory means for storing hysteresis of charge in the memory device,
- a judging means for judging whether past charging operations as stored in the memory device shorten the life of batteries, and
- a sound outputting device for outputting through sound that the hysteresis of charge is poor in case it is judged by the judging means that the life of batteries is shortened.

18. A battery charging device including a memory device for storing hysteresis of charge for charging a battery package, comprising
- a memory means for storing hysteresis of charge in the memory device,
- a life estimating means for estimating a number of possible charging operations based on the hysteresis as stored in the memory device, and
- a sound outputting device for outputting through sound the number of possible charging operations as estimated by the life estimating means.

* * * * *